March 31, 1931.  F. M. FARRIS  1,799,010
GRAIN PURIFIER
Filed Jan. 25, 1929   2 Sheets-Sheet 1
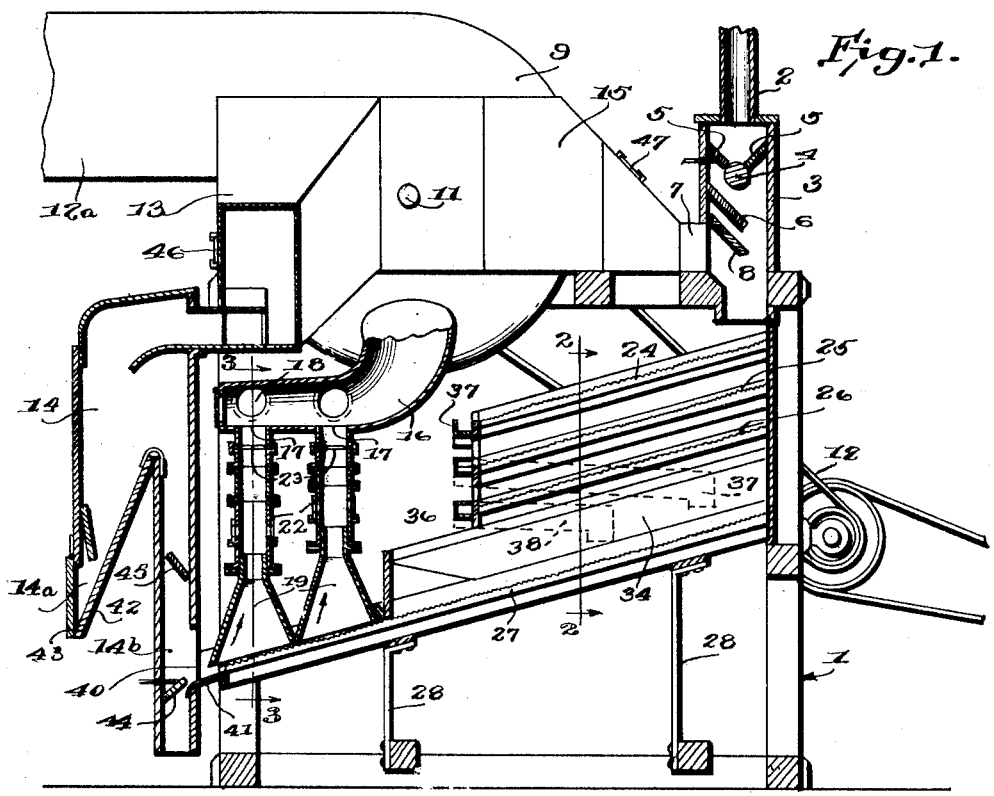

March 31, 1931.  F. M. FARRIS  1,799,010
GRAIN PURIFIER
Filed Jan. 25, 1929   2 Sheets-Sheet 2
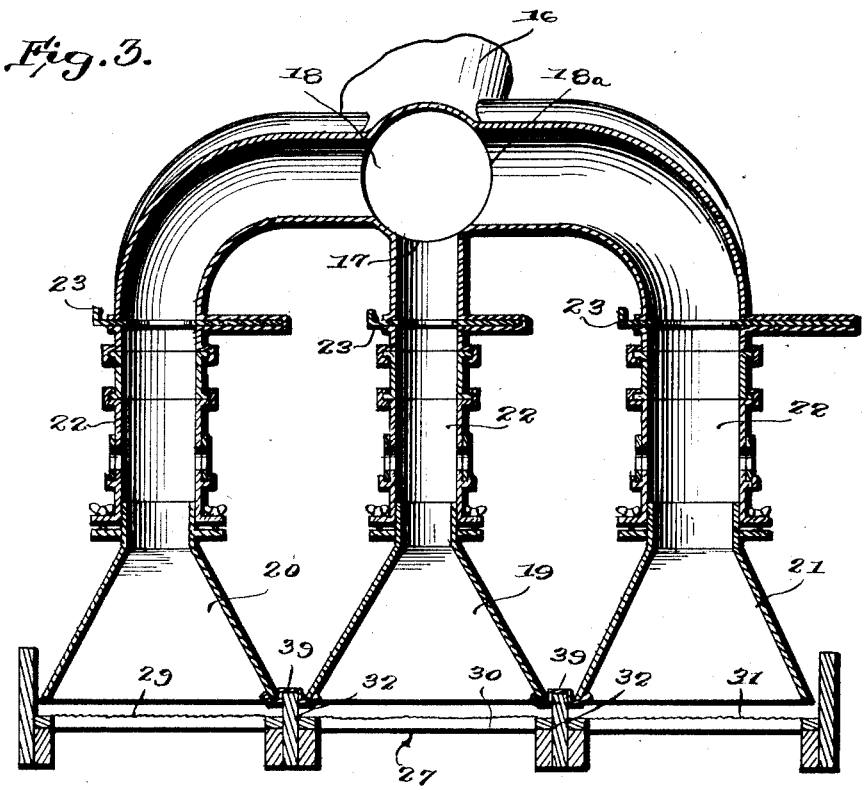
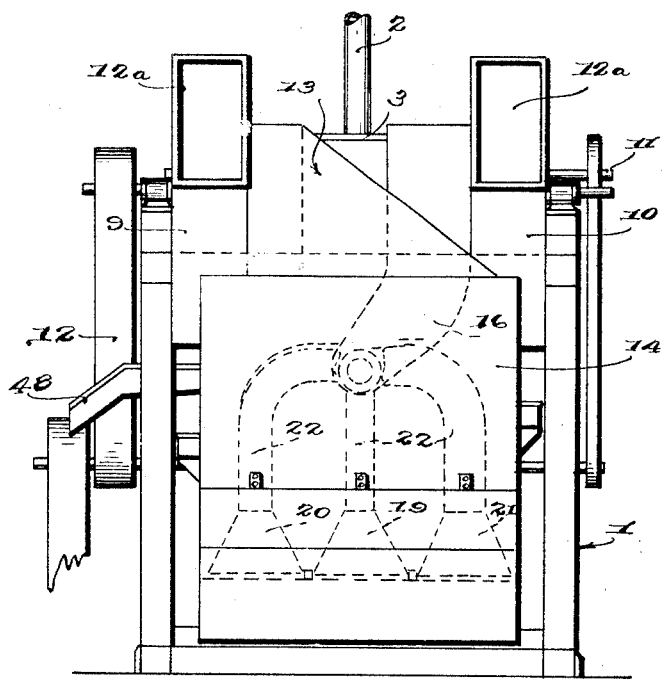
INVENTOR
F. M. Farris
BY
ATTORNEY Patented Mar. 31, 1931

1,799,010

UNITED STATES PATENT OFFICE

FRANK M. FARRIS, OF NASHVILLE, TENNESSEE

GRAIN PURIFIER

Application filed January 25, 1929. Serial No. 335,068.

My invention relates to improvements in grain purifiers, and it consists in the combinations, constructions and arrangements of parts herein described and claimed.

An object of my invention is to provide a purifier wherein the grain is graded according to size, and the application of air blasts or suctions is employed to remove chaff, onion and garlic seed from said graded grain.

A still further object of the invention is to provide a construction whereby the grain is graded automatically, such graded grain being maintained in its separated condition for separate applications of air purification.

Another object of the invention is to provide means for regulating the passage of air through the grain under treatment.

Additional objects, advantages and features of invention will be apparent from the following description, considered in conjunction with the accompanying drawings, forming part of this application in which Figure 1 is a vertical sectional view of my purifier, Figure 2 is a cross section on the line 2—2 of Figure 1, Figure 3 is a sectional view on the line 3—3 of Figure 1, illustrating the manner in which the separated grain is individually treated, Figure 4 is an end elevation of the purifier.

In carrying out my invention I provide a frame structure 1, having a grain inlet 2 at its upper part, preferably disposed at one end. The inlet 2 is enlarged as at 3 in order to accommodate a distributing roller 4, the grain being directed to the roller by plates 5. Closely adjacent the roller 4 and directly therebeneath, I provide a baffle plate 6.

Upon one side of the enlargement 3 there is provided an opening 7 and pivotally mounted adjacent thereto is a flap valve 8. The valve 8 regulates the amount of air passing through the opening 7, but this feature will be dealt with in greater detail.

Disposed upon the top of the frame structure 1 there are suction fans 9 and 10, these fans being arranged in parallel relation and operable on a single shaft 11. The shaft 11 is provided with pulleys by which power may be applied, as indicated at 12. Each fan has an outlet conduit 12a.

The suction fan 9 has a duct 13 in communication with an aspirator leg 14, the rear portion of the duct being reduced as at 15, for engagement within the opening 7.

Reference is now made to Figures 1 and 4 wherein it will be seen that fan 10 is provided with a duct 16, substantially horn-shaped and has a plurality of openings 17, 18 and 18a. The openings 17 are disposed downwardly, while, the openings 18 and 18a are arranged upon the sides of the duct 16. Detachably held within the openings 17, 18 and 18a are hoods 19, 20 and 21, respectively. These hoods are preferably connected to the duct 16 by detachable sections 22. A slide valve 23 is provided in one of the sections 22 so that the volume of air passing upwardly through the hoods 19, 20 and 21 may be regulated.

Positioned beneath the grain inlet 2, there are provided superposed screens 24, 25 and 26, these screens being arranged at an inclination to the discharge opening 2, whereby grain fed through the opening 2 and retained upon the screen, will traverse the screen, by gravity, to the lowermost point of the screen. The screens 24, 25 and 26 have a mesh progressively decreasing in size, and by such provision it will be apparent that largest grain will be retained upon the screen 24; the medium sized grain upon the screen 25, and small grain will be deposited upon the screen 26.

Within the frame structure 1, I provide a screen 27, this screen being disposed beneath the screens 24, 25 and 26 and extends the full width and length of the interior of frame 1. This screen is also arranged at an inclination, and is supported by rights 28.

Attention is now directed to Figures 2 and 3, wherein it will be seen that the screen 27 is divided into three compartments 29, 30 and 31, which is effected by the separator strips 32 secured to the frame 33. Between the screens 26 and 27, there is a guide chute 34 having inwardly sloped side walls terminating in a central opening 35. This chute is supported at its outer edges in a frame 36, and is of a length and width to extend over the entire area of the screen 26, in order to catch and divert all grain falling through the screen 26 into the compartment 30.

Each of the screens 24 and 25 has at its lowermost point a grain-receiving chute 37 and 38 respectively. The chute 37 will convey grain received from the screen 24 to the compartment 29, while the chute 38 directs grain from the screen 25 to the compartment 31. By this arrangement the grain will be classified in three separate compartments, the distribution being according to the varying size of the grain.

The suction hoods 19, 20, and 21 are clearly illustrated in Fig. 3, and it will be seen that the hoods are positioned closely to the screen 27, and that the hoods adjacent the separator strips 32 rest within a grooved cap 39. By this construction, a more efficient suction is created between the screen 27 and the hoods.

It has been found in practice, that the largest amount of air is required in operation upon the largest grains, while the air required for the medium and smallest sized grains is proportionately less. Therefore, the conduit connecting the hood 21 is represented as the largest, adapted to act upon the largest grain; the conduit connecting the hood 20 of lesser size; and the conduit connecting the hood 19, the smallest. In this way, the air is properly distributed through the various hoods, but the air volume may be further regulated by virtue of the slide valves 23.

The aspirator leg 14 is illustrated as being branched, as at 14a and 14b. The branch 14b is positioned next adjacent the frame 1, and has an opening 40 closely adjacent the hoods 19, 20 and 21. A chute 41 connects the screen 27 with the branch 14b as shown. (See Fig 1).

Hingedly mounted upon the branch 14b is a valve 42 adapted to coact with a swinging flap-valve 43 carried by the branch 14a. These valves 42 and 43 may be manipulated to vary the suction of air through the branch 14b.

The branch 14b may also have valves 44 and 45 for further regulation of air, and the ducts 13 and 15 may also be provided with valves 46 and 47, respectively.

In the operation of my device, with the fans 9 and 10 in motion, grain is fed into the purifier through the inlet 2, the bulk of grain being distributed and agitated by the roller 4 and deflector plate 6. Thus as the grain passes the opening 7, the grain, chaff, onion and garlic seed will be in a high state of agitation, and certain of the chaff, onion and garlic seed will be drawn into the conduit 15. The grain passes on downward and strikes the screen 24, where the small and medium sized grain, garlic and onion seed pass through to the screen 25 immediately therebelow. The large grain passes downwardly upon the screen, into the chute 37. The chute 37 conducts the grain, by gravity, to the compartment 29. The medium-sized grain, garlic and onion seed, pass downwardly upon the screen 25, to the chute 38. The chute 38 conducts the grain to the compartment 31. The small grain, onion seed and garlic will pass through the screen 25 and finally rests upon the screen 27 within the compartment 30. The small grain is guided to the compartment 30 by the chute 34, as clearly illustrated in Figure 2.

While I have shown and described the grain as being assorted into three sizes it will be apparent that additional screen elements and troughs may be provided, and thus effect a finer separation of the grain.

Having assorted and deposited the grain upon the screen 27, within their respective compartments 29, 30 and 31, the grain moves downwardly until it is disposed beneath the hoods 19, 20 and 21. Suction is created within the conduits 16 and 22 and the hoods 19, 20 and 21 by the fan 10. This suction, as may be readily seen will draw the light particles, such as chaff, onion and garlic seed, from the grain, such foreign matter being discharged by way of the chute 48. After elimination of such foreign matter, the grain from the several compartments is discharged upon the chute 3. At this point the grain may be discharged into suitable storage receptacles, or sacked as the case may be.

During the suction action through the hoods, there is also created a suction within the aspirator leg 14 by the fan 9. The volume of air passing through this leg being regulated by the valves 44 and 45. The valve 44 is so positioned that some of the air may be diverted inwardly and upwardly toward the hoods 19, 20 and 21, to assist in removal of foreign matter. It will also be apparent that air passing upwardly through the branch 14b of the leg 14 will have a further cleansing effect upon the grain.

What is claimed is:

1. A grain separator comprising an inclined grain chute, said chute being divided by walls to provide separate compartments, suction hoods disposed within said compartments, and grooved cap members carried by said walls to receive said suction hoods.

2. A grain separator comprising a chute, said chute being divided by walls to provide separate compartments suction hoods disposed within said compartments, said hoods having downwardly flared mouths, disposed within said compartments, and cap members having grooves carried by said walls to receive said flared mouths.

3. A grain separator comprising a frame, a hopper on said frame, a divided chute carried by said frame, suction fans, suction hoods associated with each division of said chute, conduits connecting one of said fans to said hood, said conduits being of different diameters, an air shaft communicating with the discharge end of the chute and conduits connecting the other of said fans to said hopper and to said shaft.

4. A grain separator comprising a frame, a divided chute carried thereby, suction fans on said frame, suction hoods associated with each division of said chute, conduits connecting one of said fans to said hoods, said conduits being of different diameters, an air shaft communicating with the discharge end of said chute adjacent said hood, a conduit connecting said air shaft to the other of said fans and an adjustable deflector positioned in said air shaft for regulating the flow of air through said air shaft and for directing said air through said hoods as desired.

FRANK M. FARRIS.